United States Patent [19]

Kohno et al.

[11] Patent Number: 5,343,257
[45] Date of Patent: Aug. 30, 1994

[54] SCREEN COVER OPENING/CLOSING DEVICE FOR TELEVISION RECEIVER

[75] Inventors: Fumio Kohno; Hisashi Suwa; Seizi Sato, all of Kanagawa, Japan

[73] Assignee: Sony Corporation, Tokyo, Japan

[21] Appl. No.: 872,348

[22] Filed: Apr. 23, 1992

[30] Foreign Application Priority Data

Apr. 30, 1991 [JP] Japan .................. 3-124652

[51] Int. Cl.$^5$ .................. H04N 5/65; H04N 5/72; H04N 5/64
[52] U.S. Cl. .................. 348/842; 348/836; 348/841
[58] Field of Search .............. 358/247, 250, 254, 255; 348/823, 832, 836, 842, 841

[56] References Cited

U.S. PATENT DOCUMENTS

| | | | |
|---|---|---|---|
| 4,394,690 | 7/1983 | Kobayashi | 358/180 |
| 4,556,906 | 12/1985 | Dischert et al. | 358/180 |
| 4,760,455 | 7/1988 | Nagashima | 358/140 |
| 4,951,149 | 8/1990 | Faroudja | 358/254 |
| 5,053,765 | 10/1991 | Sonehara et al. | 358/901 |

Primary Examiner—Edward L. Coles, Sr.
Assistant Examiner—Kimberly A. Williams
Attorney, Agent, or Firm—Lewis H. Eslinger; Jay H. Maioli

[57] ABSTRACT

A screen cover opening device for a television receiver is provided with a screen cover openably closing left and right side portions or upper and lower side portions of a screen adapted for electively displaying plural different aspect ratio images. Two vertically extending rolls 5a, 5b are arranged at outwardly shifted positions from left and right lateral sides wrapped around of the screen 2 and an endless cover sheet 3 is wrapped around these rolls. Two windows 4a, 4b are formed at longitudinally spaced apart positions of the cover sheet 3. The rolls are rotated to run the cover sheet to change overlap of the two windows to change the transverse width W that may be viewed through overlapped portions of the two windows.

8 Claims, 11 Drawing Sheets

SCREEN COVER OPENING/CLOSING DEVICE FOR TELEVISION RECEIVER

BACKGROUND OF THE INVENTION

1. Field of the Invention

This invention relates to a device for opening and closing a screen cover for a television receiver for selectively displaying plural types of images with different aspect ratios which is arranged on the front side of the television screen of the television receiver and which is adapted for opening or receiving left and right sides and upper and lower ends of the screen in association with the different types of images.

2. Description of the Prior Art

Recently, a move towards widescreen telecasting (so-called high-vision system) system is proceeding. If such system is realized, a television screen with a 4:3 aspect ratio co-exists with a 16:9 aspect ratio.

For receiving the high-vision telecasting by a television receiver of the standard system, such as the NTSC system, PAL system or SECAM system, with the aspect ratio of 4:3, for displaying the image, left and right portions of the high-vision system screen are discarded to effect display in conformity to the current 4:3 system, or the high-vision system screen is compressed both horizontally and vertically so that the screen with the 16:9 aspect ratio is adapted to the 4:3 standard system television screen.

With the former, only parts of the image transmitted by the high-vision system are displayed. Thus the latter system, according to which the high-vision system image is compressed and adapted to the current screen with the aspect ratio of 16:9 remaining unchanged, is more desirable.

On the other hand, if the current telecasting is to be received with the widescreen television receiver with the aspect ratio of 16:9 for displaying the television image, it may be envisaged to use only the portion corresponding to the aspect ratio of 4:3 without using left and right panel portions of the screen.

Although it may be contemplated to cause the redundant screen region not to emit light, since the deterioration of the light-emitting elements of the television screen, such as phosphors, differs between a screen region where the image is perpetually displayed (common screen region) and a screen region other than the common screen region, or the non-common region, these two regions differ in luminosity when the image to be displayed on both of these screen regions is displayed.

In this consideration, it has been proposed to provide such television receiver with a screen cover openably closing the non-common screen region so that, when only the common screen region is in use, the non-common region is closed by the screen cover and, when the entire screen is in use, the screen cover is moved to a position of opening the entire screen surface.

FIGS. 1 and 2 illustrate two examples of the screen cover opening/closing device 100 provided with such screen cover.

It is noted that the screen cover opening/closing device 100, shown in FIGS. 1 and 2, is adapted to open or close left and side panel portions of the television screen.

Referring to FIGS. 1 and 2, 101 is a Braun tube, 102 is a phosphor surface of the Braun tube 101, a is a region of the phosphor surface 102 exclusive of both side panel regions b, b thereof, that is a common region, in which the image corresponding to the current television system is displayed. 103, 103 are flexible screen covers separately arranged at left and right side panel regions of the Braun tube 101. Referring to FIG. 1, the screen covers 103, 103 are movable between a first position in which one ends 104, 104 thereof face the left and right panel portions b, b on both sides of a center panel portion a of the phosphor surface 102, as shown in FIG. 1, and a second position in which the ends 104, 104 are moved away from the phosphor surface 102, along a path of movement by being guided by suitable guide means, not shown.

105, 105 are spools to which are separately fixed other ends 106, 106 of the screen covers 103, 103 and which are rotationally driven by driving means, not shown. The screen covers 103, 103 are moved by rotation of these spools 105, 105.

When the spools 105, 105 are rotated in predetermined amounts in the screen cover take-up direction, from the position corresponding to the first position of the screen covers 103, 03, these screen covers are moved to the second position shown in FIG. 2, for opening the phosphor surface 102 in its entirety. In this position, the images of the high-vision screen are displayed. If the spools 105, 105 are rotated in the opposite direction, that is in the direction of reeling out the portions of the screen covers 103, 103 taken up on the spools, the screen covers 103, 103 are moved to the first position shown in FIG. 1, so that the left and right side portions b, b of the phosphor screen 102 are covered by the screen covers 103, 103. The images of the current television system are displayed in this condition on the television receiver.

With the above described screen cover opening/closing device, since the spools 105, 105 are spaced apart from each other on both sides of the screen, two separate driving sources need to be electrically synchronized with each other, or a single driving source needs to be mechanically connected to each other for synchronization.

If the spools 105, 105 are not mechanically synchronized with each other, but simply electrically synchronized with each other, the screen covers 103, 103 may be moved differentially, in which case the opening degrees will be different between the screen covers 103, 103.

On the other hand, if the spools 105, 105 are mechanically synchronized with each other, although there is produced no difference in the opening degrees of the screen covers 103, 103, the driving source needs to be connected to the spools with the Braun tube 102 in-between to lead to complicated and bulky construction.

OBJECTS AND SUMMARY OF THE INVENTION

It is an object of the present invention to provide a screen cover opening/closing device whereby the screen of the television receiver, designed for selectively displaying plural types of images with different aspect ratios, may be variably opened or closed in conformity to the aspect ratio of the images currently received by the television receiver.

It is another object of the present invention to provide a screen cover opening/closing device of a reduced thickness whereby stabilized feed of a cover sheet closing and opening the screen of the television receiver in conformity to the aspect ratio of the television signals currently received by the television receiver may be achieved.

The present invention provides a screen cover opening/closing device arranged at a front side of a screen of a television receiver adapted for selectively displaying plural different aspect ratio signals, said screen cover opening/closing device being adapted for opening and closing left and right side panel portions of the screen, comprising two vertically extending rolls arranged at laterally outer sides of left and right lateral sides of said screen, a cover sheet endlessly wrapped around said rolls and formed with two windows at longitudinally spaced apart positions, and cover sheet running means for running said cover sheet by rotating said rolls.

Other objects and advantages of the present invention will become apparent from the following description.

DESCRIPTION OF THE PREFERRED EMBODIMENTS

Figure 1:
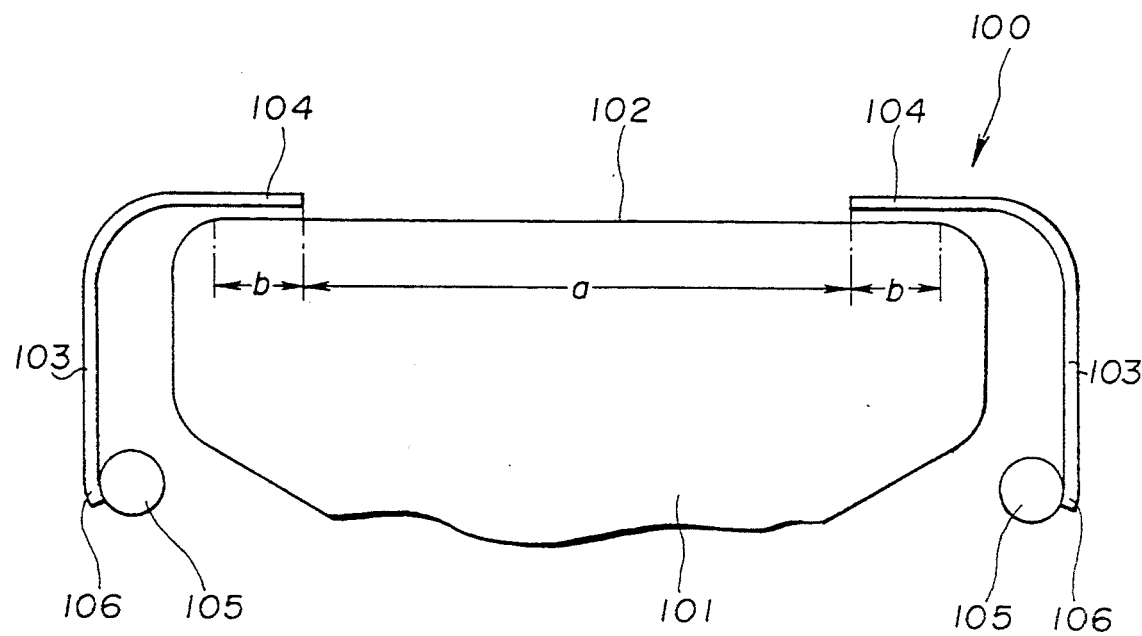
FIG. 1 is a top plan view showing a conventional screen cover opening/closing device, which is set for images of the current television system.
Figure 2:
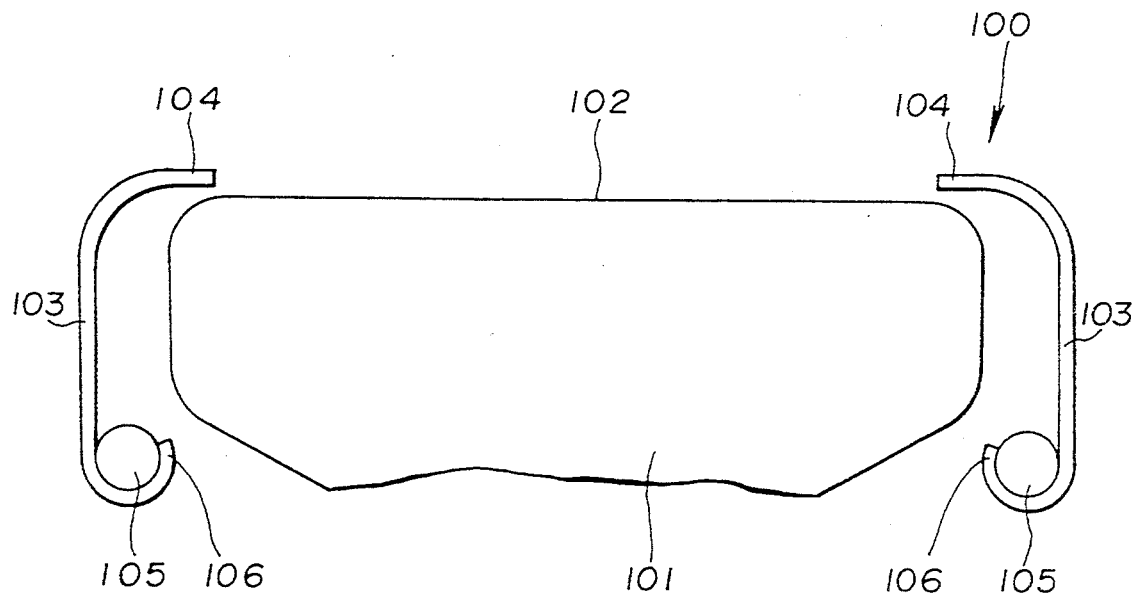
FIG. 2 is a top plan view showing the conventional screen cover opening/closing device of FIG. 1, which is set for images of the high-vision on television system.

Referring to the drawings, certain preferred embodiments of the present invention will be explained in detail.

First, the principle of the screen cover opening/closing device according to the present invention will be explained.

Figure 3:
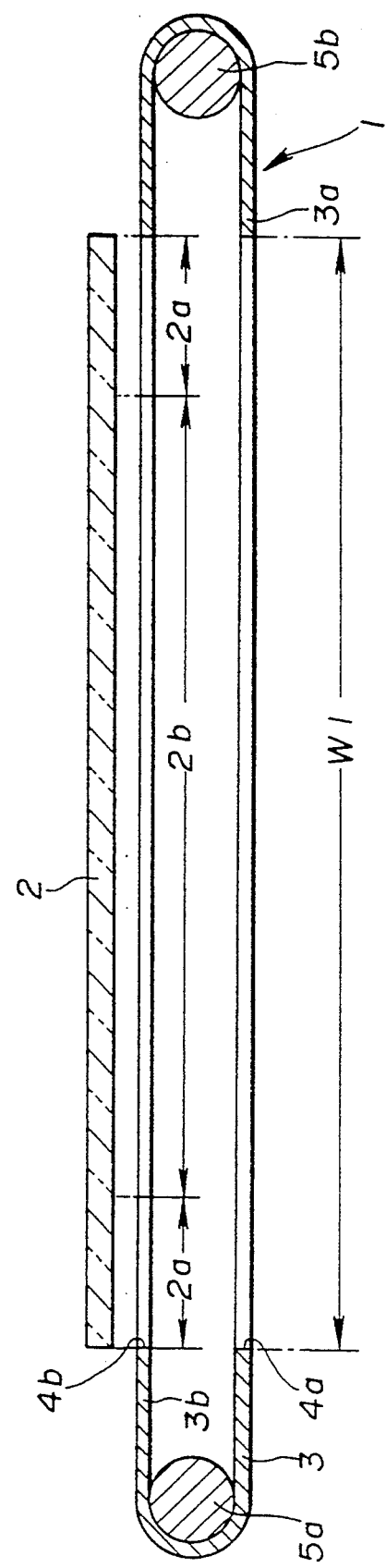
FIG. 3 is a longitudinal cross-sectional view of a screen cover device according to the present invention, adapted for images of the high-vision television system.
Figure 4:
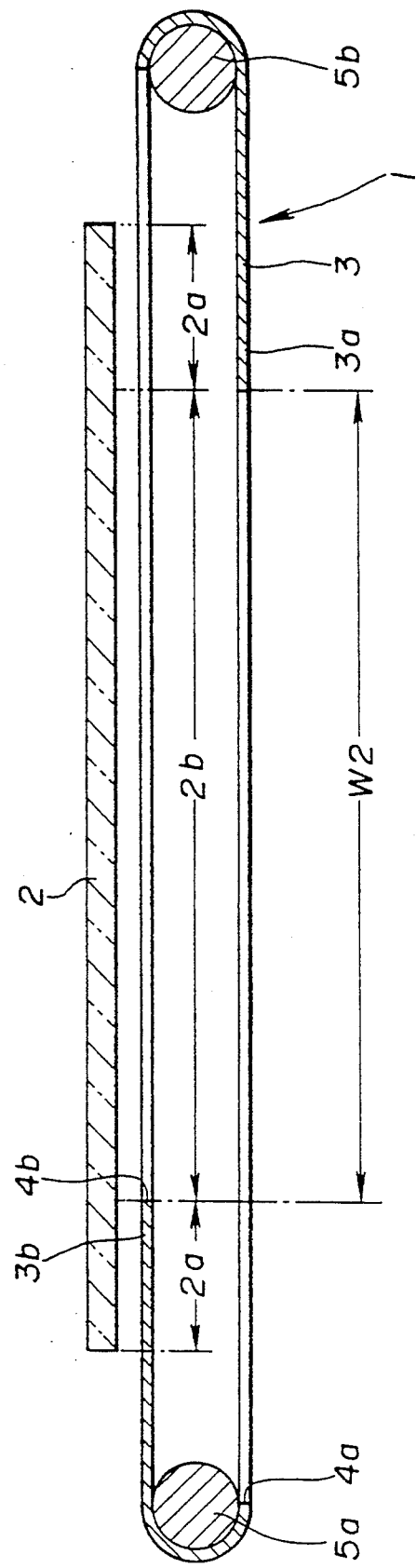
FIG. 4 is a longitudinal cross-sectional view of the screen cover device according to the present invention, similar to FIG. 3, adapted for images of the current television system.
Figure 5:
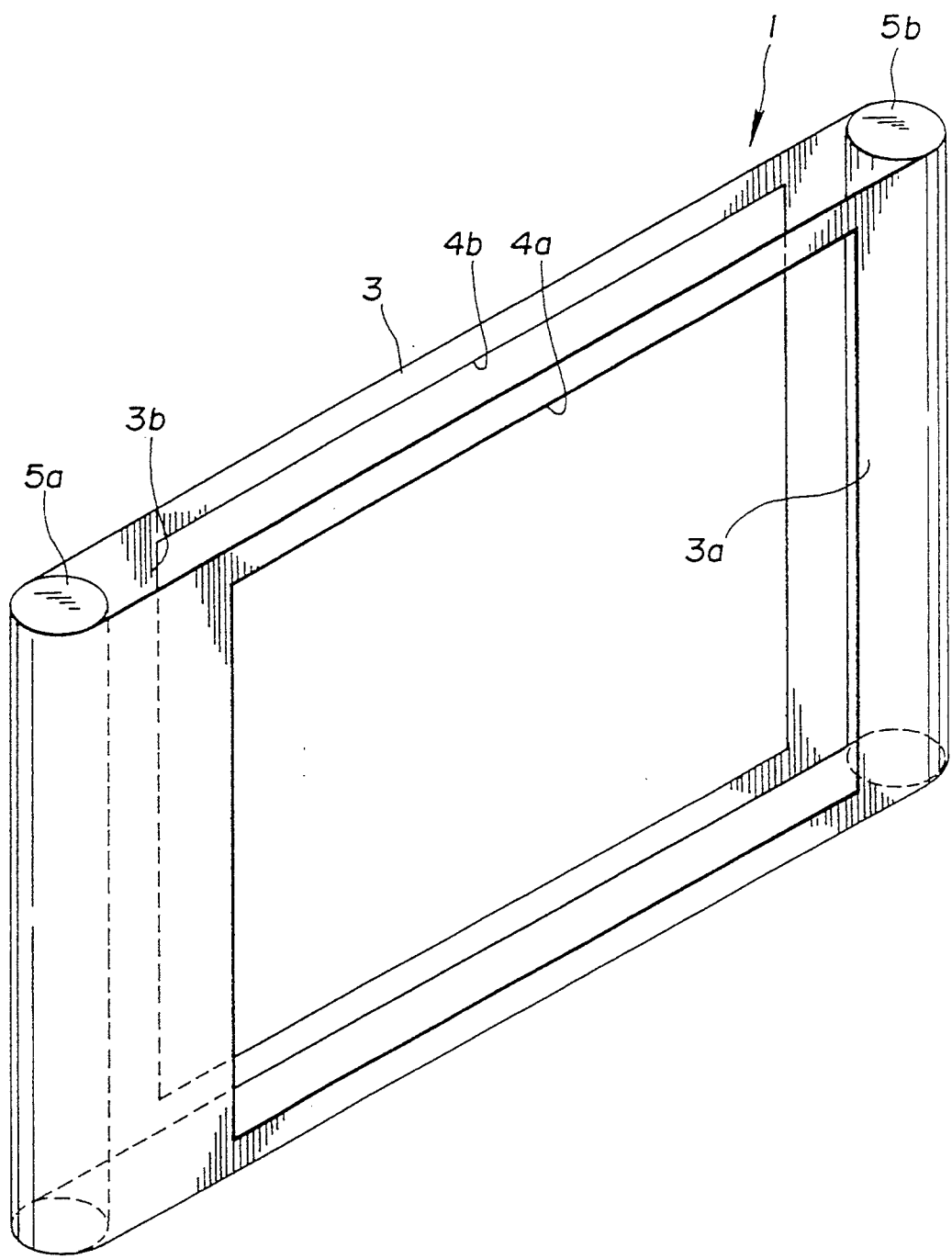
FIG. 5 is a perspective view for illustrating the principle of the screen cover opening/closing device according to the present invention.

A screen cover opening/closing device 1 according to the present invention is shown basically in FIGS. 3 to 5, where 2 denotes a screen in the form of a rectangle having longer sides in the transverse or transverse direction. The images of the high-vision television system are displayed on the screen 2 in its entirety, while the images of the current television system are displayed on an area 2b, referred to hereinafter as a common area, which is the surface of the screen 2 less left and right side panel areas 2a, 2b, referred to hereinafter as non-common areas.

3 is an endless opaque cover sheet having a vertical width slightly larger than the vertical width of the screen 2 and a length longer than the transverse length of the screen 2.

4a, 4b are windows formed in the cover sheet 3 so as to be substantially coextensive with the screen 2, with the lengths between the ends of the windows 4a being substantially equal to those between the ends of the windows 4b.

5a, 5b are rolls arranged for extending vertically on both sides of the screen 2 in proximity to the front side of the screen 2. The above-mentioned cover sheet 3 is wound endlessly between the rolls 5a, 5b. One of these rolls 5a, 5b is rotationally driven by an electric motor, not shown. The cover sheet 3 is caused to run by rotation of the roll 5a.

When the cover sheet 3 is at the first position shown in FIG. 3, that is at a position in which the windows 4a and 4b are in register with each other when viewed from the front side, the screen 2 in its entirety is opened to the front side via the windows 4a and 4b.

When the cover sheet 3 is moved a predetermined distance equal to the transverse width of the non-common areas 2a, 2a as far as a second position shown in FIG. 4, a portion 3a of the cover sheet 3 located to the right of the front-side window 4a conceals a right side panel portion 2a of the screen 2, while a portion 3b of the cover sheet 3 located to the left of the rearside window 4b conceals a left side panel portion 2a of the screen 2. In this state, only the common region 2b of the screen 2 can be viewed from the front side.

With the cover sheet 3 in the first position, the transverse width W1 of the screen area that may be viewed through the windows 4a, 4b is equal to the transverse width of the screen 2 in its entirety. On the other hand, with the cover sheet 3 in the second position, the transverse width W2 of the screen 2 that may be viewed through the windows 4a, 4b is equal to the transverse width of the common region 2b.

FIGS. 6 to 11 illustrate the above-described screen cover opening/closing device 1 as applied to a screen cover opening/closing device 1A for a liquid crystal type projector, according to the first embodiment of the present invention.

6 is a liquid crystal type projector, only the front side of which is shown. 7 is an outer casing of the liquid projector, with only the front side thereof being shown. 8 is a front side wall of the outer casing 7 formed with a rectangular window 9 having the long sides extending in the transverse direction.

10 is a screen frame arranged within the outer casing 7 and having a front side opening 10a in proximity to the window 9.

11 is a liquid crystal display panel fitted to the screen frame 10 for closing the front opening 10a of the screen frame 10. On this liquid crystal display panel 11, one of the images of the high-vision television system and the images of the current television system is displayed selectively. That is, the images of the high-vision television system are displayed on the entire surface of the liquid crystal display panel 11, while those of the current television system are displayed in a region 11b (common region) of the liquid crystal display panel 11 excluding left and right side panel sections 11a, 11b (non-common regions).

The window 9 in the outer casing 6 is substantially coextensive with the liquid crystal display panel 11.

The screen cover opening/closing device 1A is made up mainly of two main rolls, a cover sheet wrapped endlessly about these main rolls, sub-rolls for controlling the front and rear running routes of the cover sheet in a direction of drawing these running routes closer towards each other, and driving means for rotationally driving one of the two main rolls.

12a, 12b are upper and lower supporting plates provided within the outer casing 7 with the front side end of the screen frame in-between.

13 and 14 are two columnar-shaped parallel vertically extending main rolls mounted at substantially equal intervals from left and right lateral sides of the screen frame 10.

Columnar-shaped shafts 13a, 13a, 14a, 14a are passed vertically through the center of upper end faces and the lower end faces of the main rolls 13, 14 so as to be supported rotatably by the supporting plates 12, 12. The forward sides of the outer periphery of these shafts are positioned between the screen frame 10 and the front wall 8 as viewed in the transverse direction.

Figure 9:
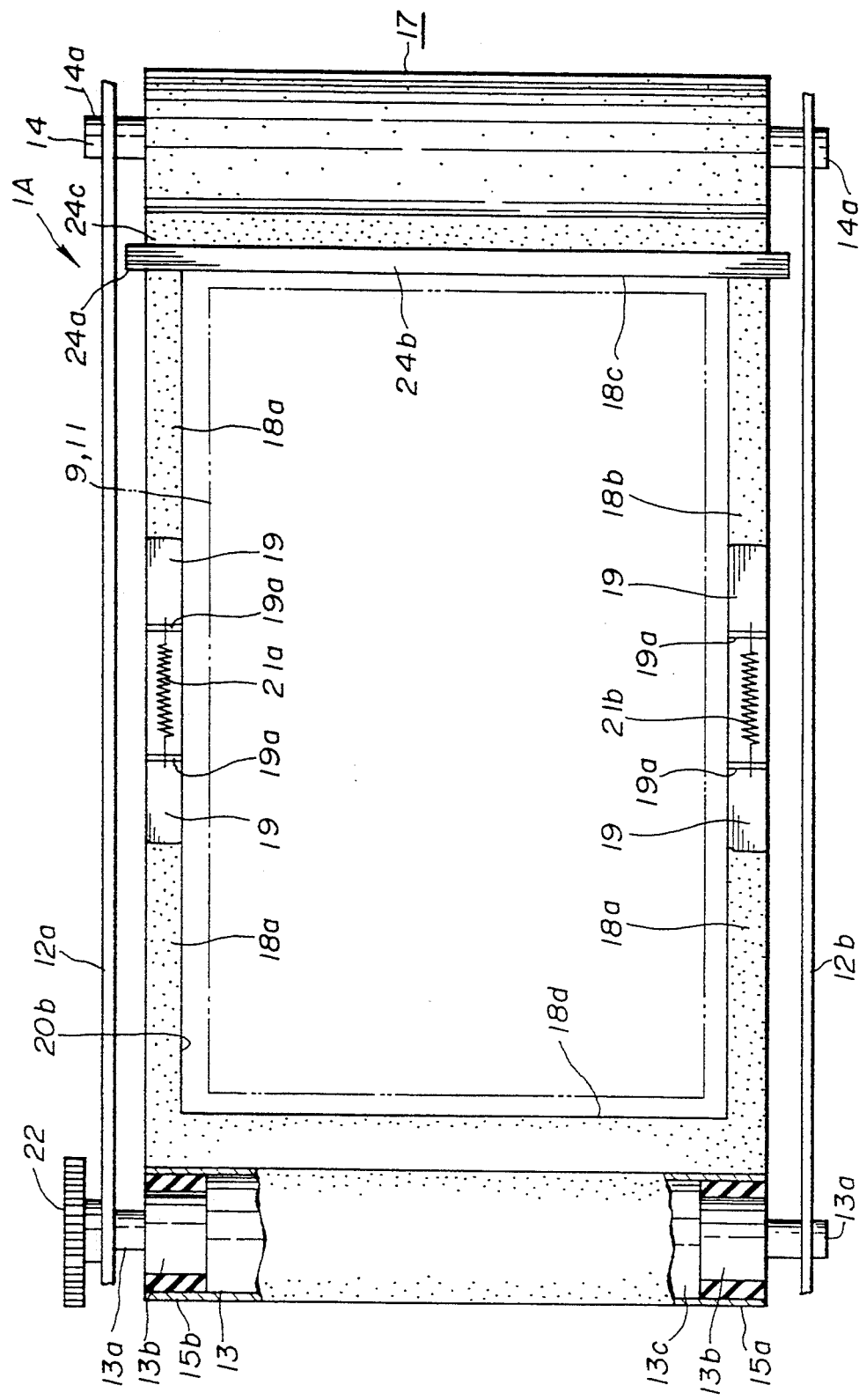
FIG. 9 is a rear side view showing the screen cover opening/closing device shown in FIG. 6, with portions thereof being broken away.

The portions 13b, 13b of the main roll 13 towards the upper and lower shafts 13a, 13a are of a slightly lesser diameter than the remaining portion 13c, as shown in FIG. 9. Friction rings 15a, 15b formed of a material having high frictional coefficients, such as rubber, are fitted over these portions 13b, 13b so that the outer peripheral surfaces of these friction rings 15a, 15b are flush with or slightly higher than the outer periphery of the portion 13c.

16a, 16b are columnar-shaped sub-rolls having the diameters being smaller than that of the main rolls 13 or 14. These sub-rolls have their upper and lower ends rotatably supported by the supporting plates 12a, 12b, and are arranged between the main rolls 13, 14 and the screen frame 10 in parallel with the main rolls 13 and 14 so that the sub-rolls are disposed slightly at the back of a line interconnecting the forward sides of the outer peripheral surfaces of the main rolls 13, 14.

17 is a cover sheet formed of a relatively non-extensible sheet-shaped material, such as nylon. The cover sheet 17 has a vertical width slightly larger than the vertical width of the liquid crystal display panel 11 and a length larger to some extent than twice the transverse width of the display panel 11.

At the left and right side ends of the cover sheet 17 are formed substantially rectangular openings 18c, 18d opened at one sides towards the opposite ends. To the front side ends of the upper and lower side frames 18a, 18b—defining these openings 18c, 18d are secured spring retainers 19a, 19b—which are substantially L-shaped when seen from above, such as with an adhesive, so that these spring retainers 19a, 19b are projected towards a rear side.

The openings 18c, 18d are of a vertical width substantially equal to the vertical width of the liquid crystal display panel 11 and of the transverse width slightly less than the transverse width of the liquid crystal display panel 11.

20 is a window formed substantially centrally of the transverse length of the cover sheet 17 and being substantially coextensive with the liquid crystal display panel 11 as viewed from the front side.

Figure 6:
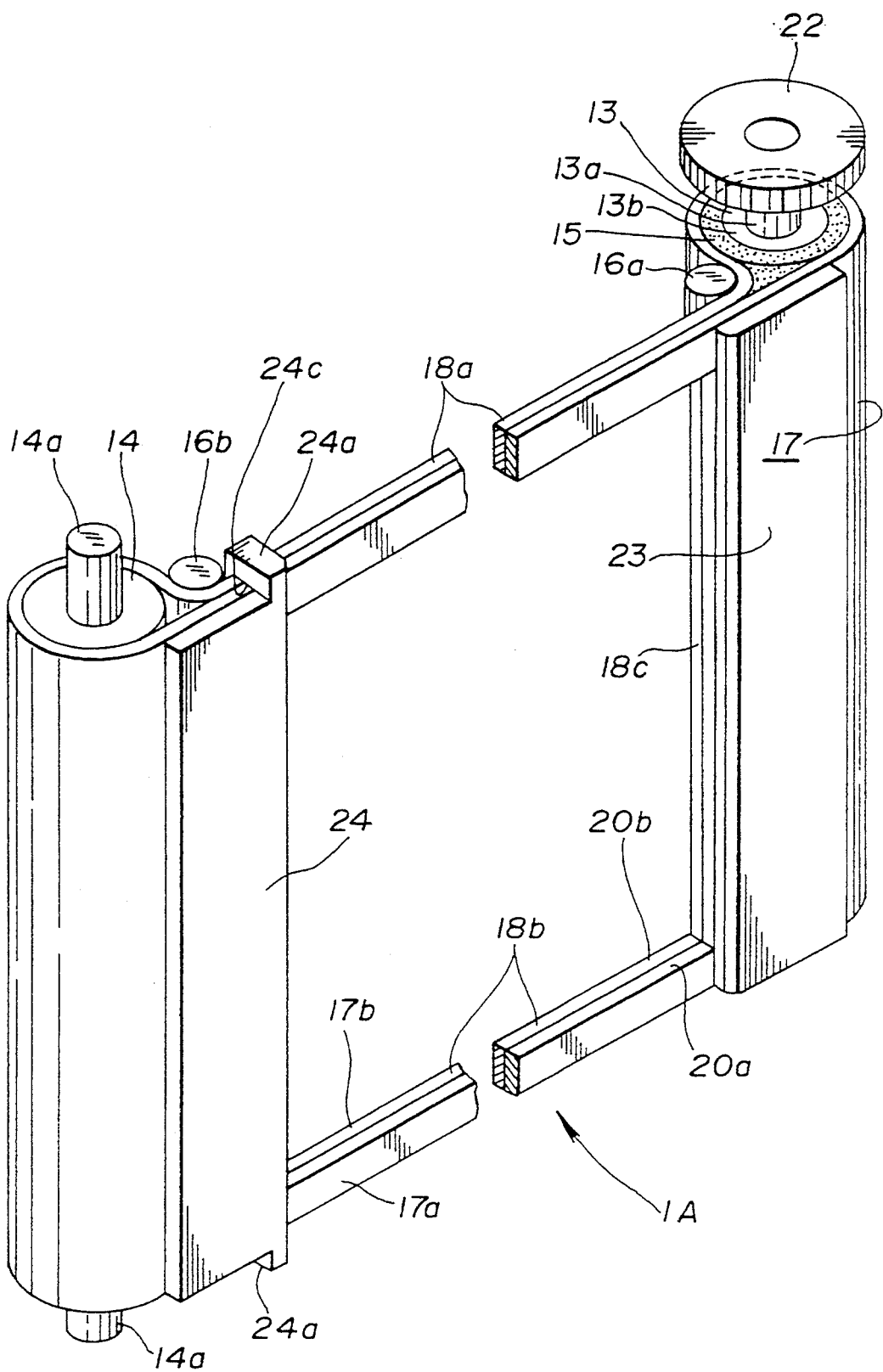
FIG. 6 is a perspective view showing a screen cover opening/closing device according to a first embodiment of the present invention, as applied to a liquid crystal type projector, with a cover sheet being partially removed.

The above-mentioned cover sheet 17 is placed around the main rolls 13, 14 and the sub rolls 16a, 16b, as shown in FIG. 6, and has its both ends connected to each other in an endless manner by tension springs 21a, 21b installed under tension between the spring retainers 19, 19—provided at the ends of the cover sheet 17.

The cover sheet 17 is in an endless shape and the open sides of the two rectangular openings 18c, 18d are joined together at upper and lower rim parts so that a window 20b is formed at a rear run of the cover sheet 17 in addition to a window 20a formed at a forward run of the cover sheet 17, with the window 20b being substantially coextensive with the window 20a.

The cover sheet 17 has its ends connected to each other in an endless manner by the tension springs 21a, 21b and is wrapped taut around the main rolls 13, 14 and the sub-rolls 16a, 16b.

In this manner, the cover sheet 17 is rendered endless and has two rectangular openings 18c, 18d connected at one ends so that a window 20a is formed in a front run 17a of the cover sheet 17 while another window 20b is formed in a rear run 17b of the cover sheet 17, with the windows 20a, 20b being substantially the same in size.

The cover sheet 17 is tightly wrapped around the main rolls 13, 14 in a slip-free manner between the rolls 13, 14 and the friction rings 15a, 15b, so that the cover sheet 17 is caused to travel on rotation of the main rolls 13.

22 is an input gear secured to the upper shaft 13a of the main roll 13 and rotationally driven by a driving unit, not shown, for rotationally driving the main roll 13.

23, 24 are decorative plates mounted on the front side of the cover sheet 17. These decorative plates 23, 24 are of a length substantially equal to the vertical width of the cover sheet 17 and of a transverse width substantially equal to the transverse width of the non-common regions 11a, 11a of the liquid crystal display panel 11.

The decorative plate 23 is secured to the front run 17a of the cover sheet 17 so that its left-side edge as viewed from the front side is coincident with the right-side edge of the frontside window 20a.

The upper and lower side edges of the decorative plate 24 are formed with extensions 24a, 24a extending from the respective right sides towards the rear, while a rear lug 24b interconnecting the rear ends of the extensions 24a, 24a is formed integrally with the extensions 24a, 24a, so that an insertion gap 24c is defined at the right rear side of the decorative plate 24.

The front run 17a and the rear run 17b are passed through the gap 24c of the decorative plate 24 and the rear lug 24c is secured to the rear run 17b so that the left side edge of the window 20b of the rear run 17b is coincident with the right side edge of the decorative plate 24 when viewed from the front side.

When the cover sheet 17 is caused to travel along its route of travel, the window 20a formed in the front run 17a and the decorative plate 23 travel in a left or right direction, while the window 20b formed in the rear run 17b and the decorative plate 24 travel in the opposite direction, that is in the right or left direction.

Figure 7:
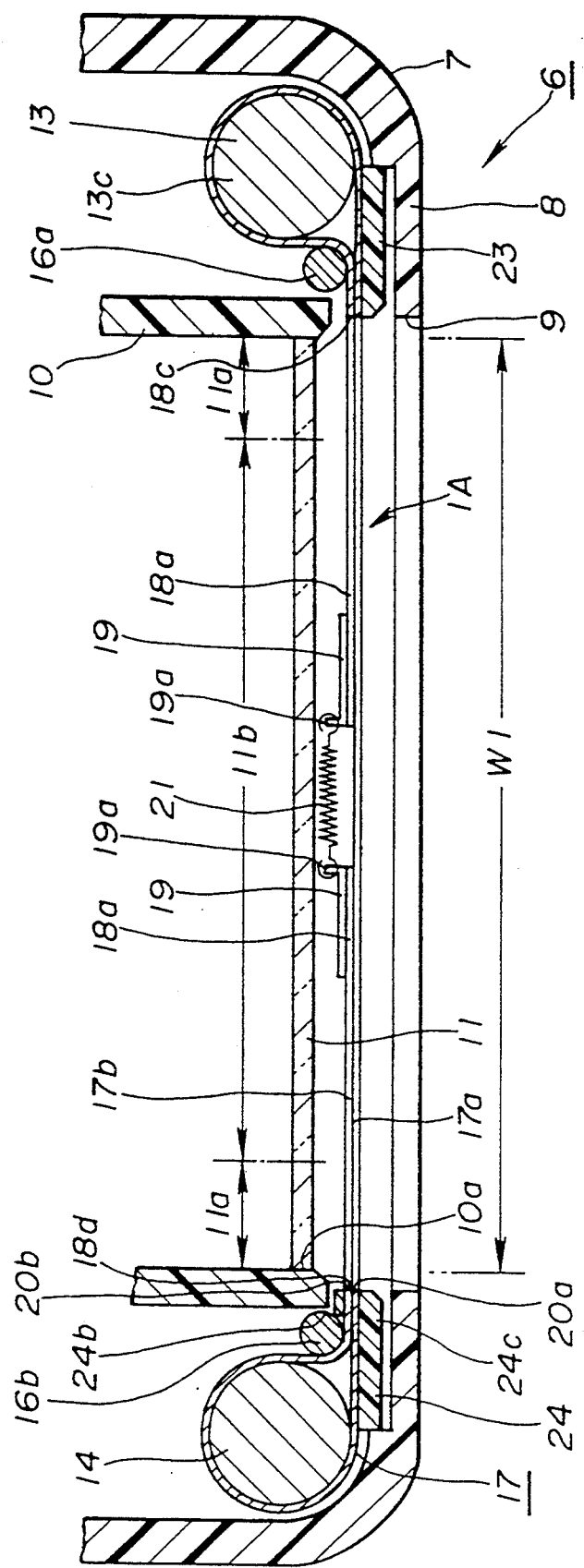
FIG. 7 is a longitudinal cross-sectional view showing the screen cover opening/closing device shown in FIG. 6, adapted for images of the high-vision television system.
Figure 10:
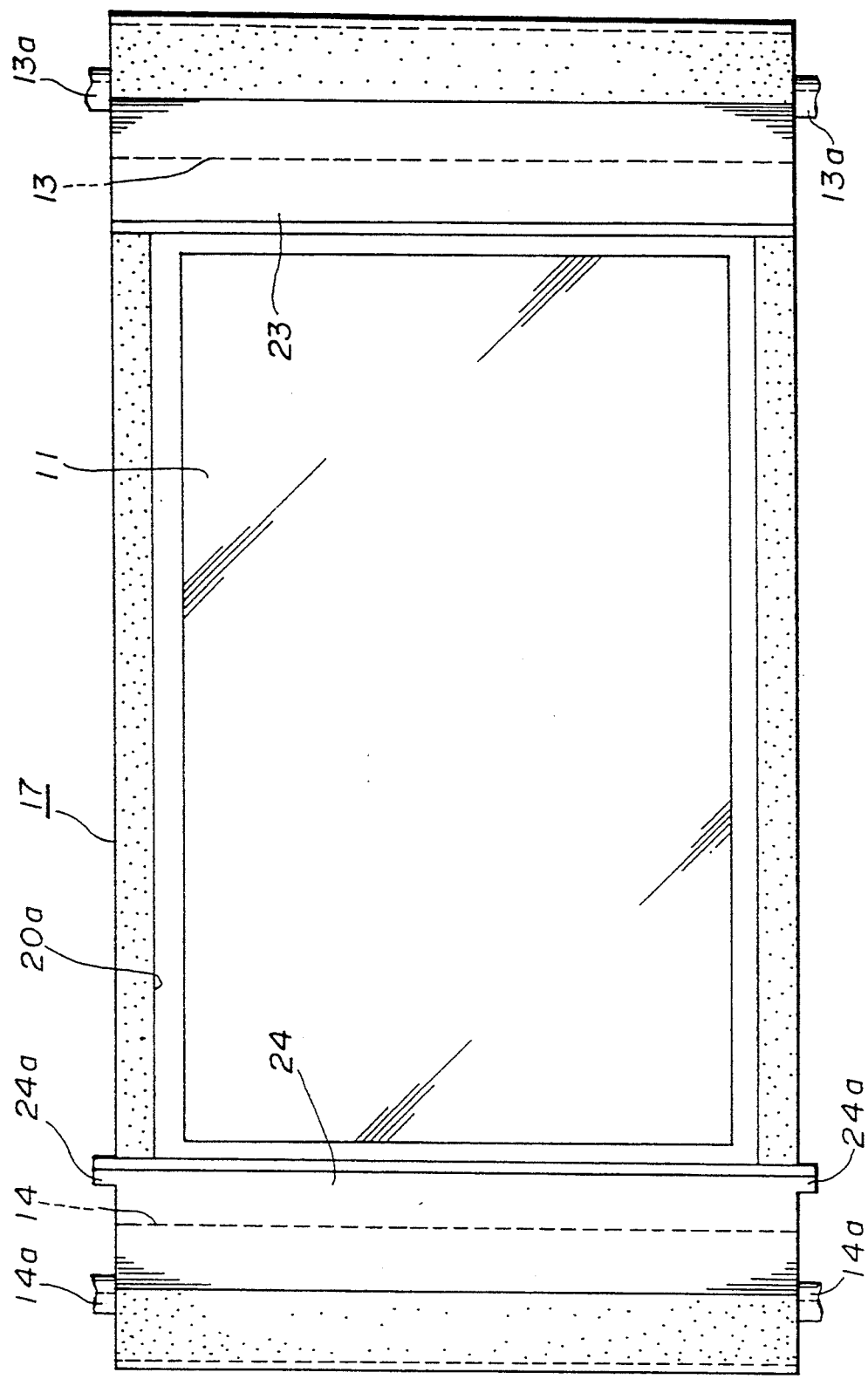
FIG. 10 is a front view showing essential parts of the screen cover opening/closing device shown in FIG. 6, adapted for images of the high-vision television system.

When the cover sheet 17 reaches a first position in which, as shown in FIGS. 6, 7 and 10, the two windows 20a, 20b are coincident with each other as viewed from the front side, the liquid crystal display panel 11 in its entirety is coincident with the windows 20a, 20b. In this state, the display surface of the liquid display panel 11 may be seen through the windows 20a, 20b. If the images of the high-vision television system are received in this state, the images may be seen in their entirety through the windows 20a, 20b.

If the main rolls 13 are rotated in this state clockwise as viewed from above, the front run 17a of the cover sheet 17 is moved towards left, while the rear run 17b is moved towards right, so that the window 20a and the decorative plate 23 are moved leftwards, while the window 20b and the decorative plate 24 are moved rightwards. In this manner, overlap of the windows 20a and 20b is decreased in the transverse direction so that the transverse width of the liquid crystal display panel 11 as viewed through these windows 20a, 20b is diminished.

Figure 8:
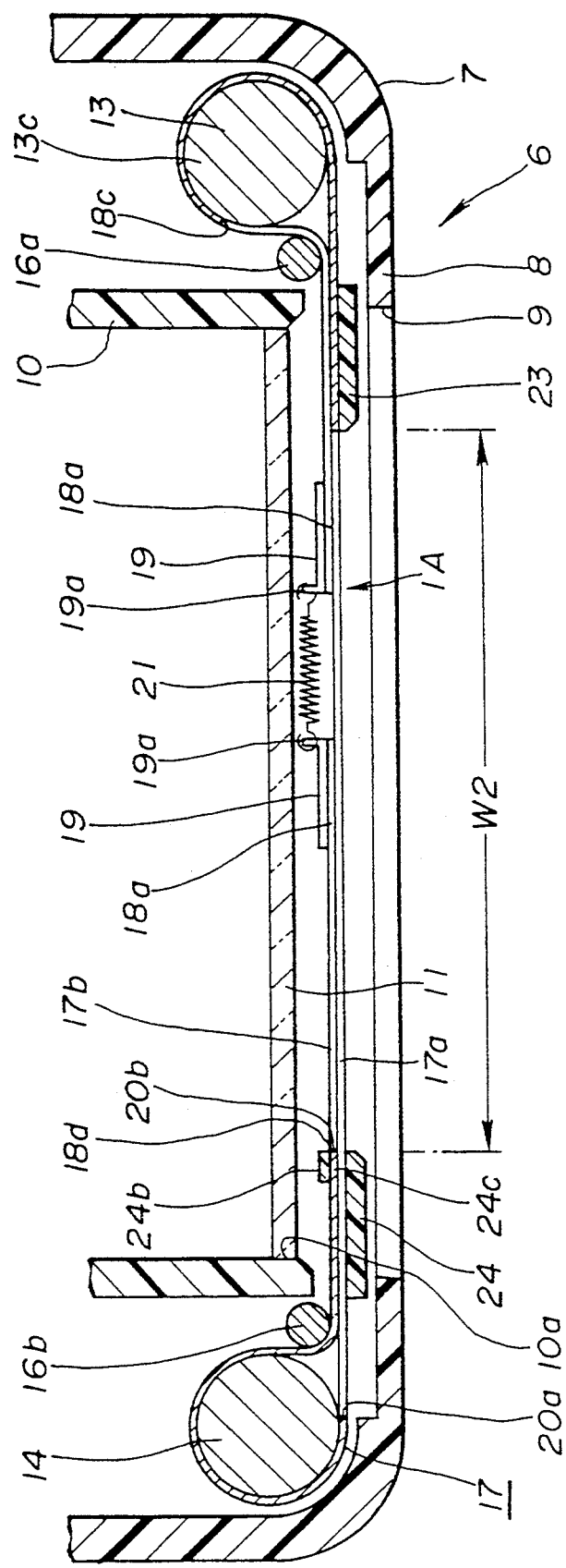
FIG. 8 is a plan view showing the screen cover opening/closing device shown in FIG. 6, adapted for images of the current television system.
Figure 11:
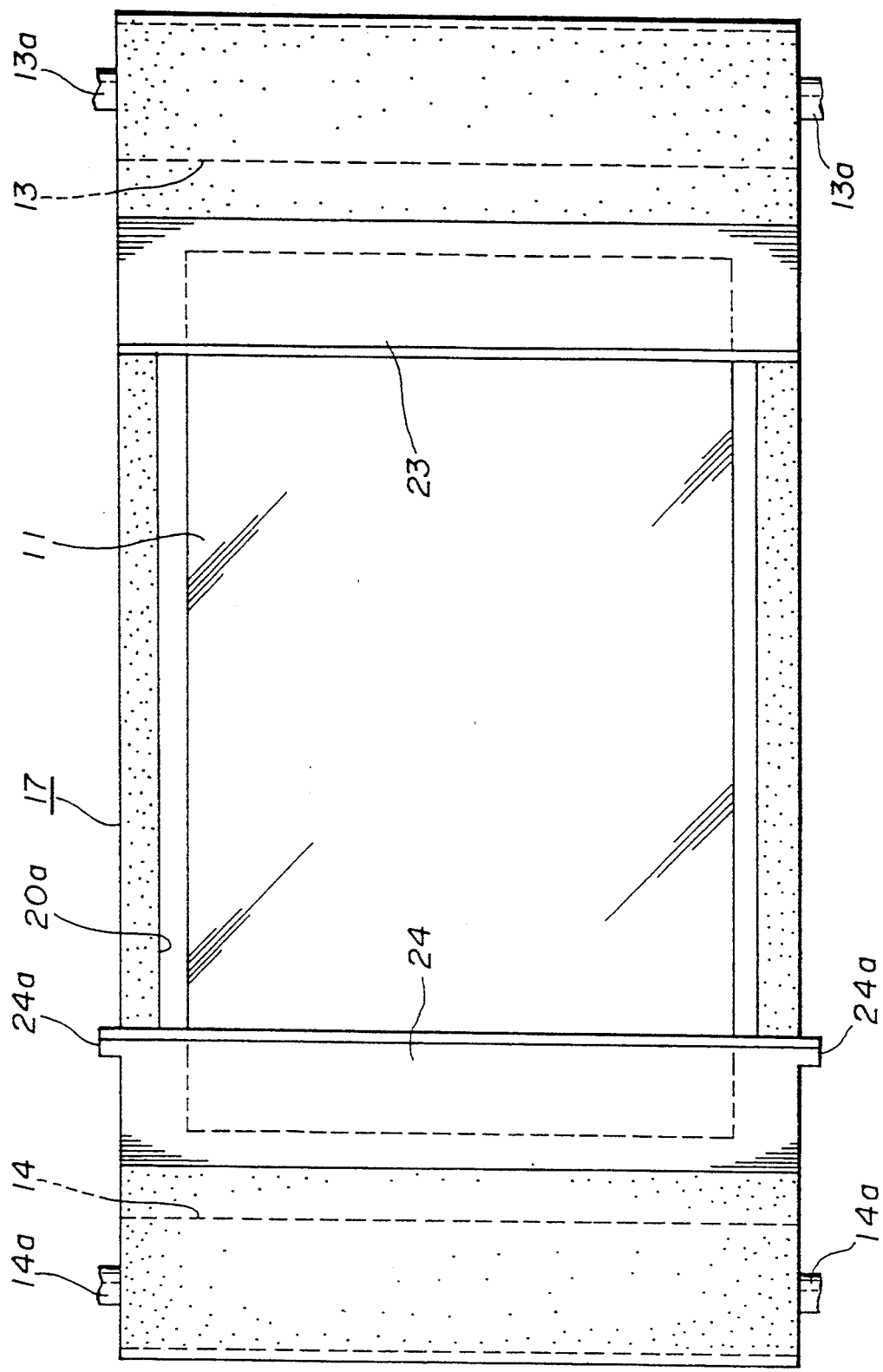
FIG. 11 is a front view showing essential parts of the screen cover opening/closing device shown in FIG. 6, adapted for images of the current television system.

The travel of the cover sheet 17 in this direction is terminated at a second position shown in FIGS. 8 and 11. In this state, the decorative plates 23, 24 conceal the non-common regions 11a, 11b of the liquid crystal display panel 11, so that only the common region 11b of the liquid crystal display panel 11 may be seen through the windows 20a, 20b. If the images of the current television system are received in this state, the portions of the display screen on which these images are displayed may be seen through the windows 20a, 20b.

It is noted that, since the cover sheet 17 is wrapped around the main rolls 13, 14 and the sub-rolls 16a, 16b in the above-described manner, there is substantially no gap between the front run 17a and the rear run 17b so that the two windows 20a, 20b appear to the viewer as if they were one window disposed in the same plane.

Figure 12:
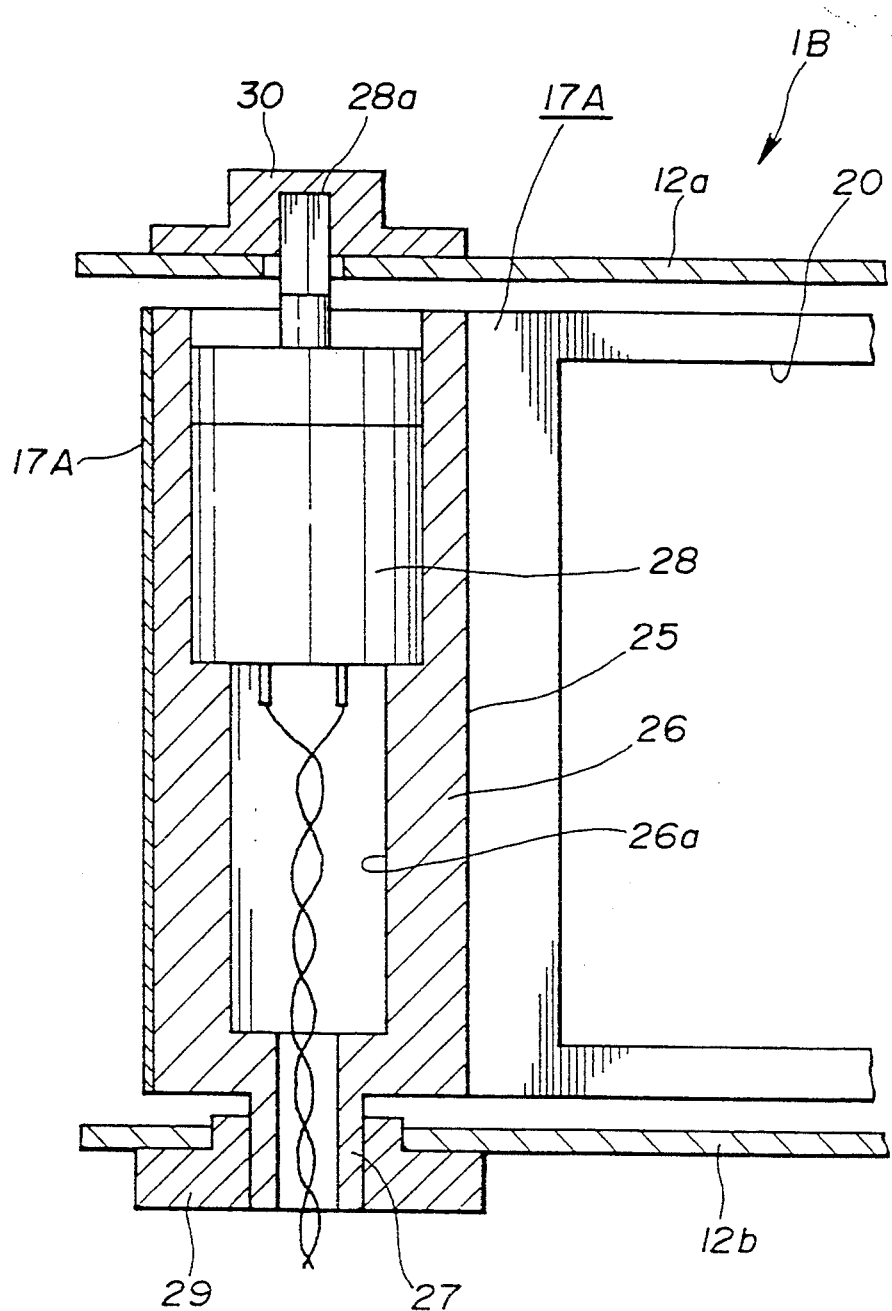
FIG. 12 is a partial longitudinal cross-section showing essential parts of a screen cover opening/closing device according to a second embodiment of the present invention.

FIG. 12 shows a second embodiment of a screen cover opening/closing device according to the present invention.

Since the screen cover opening/closing device 1B of the second embodiment differs from the screen cover opening/closing device 1A only with respect to cover sheet travelling means, only essential parts are shown in FIG. 12, and description is made only with respect to the above mentioned difference from the preceding embodiment. The components used in common with those of the preceding embodiment are indicated by the same numerals as those used in the preceding embodiment, occasionally added to by alphabet suffixes.

17A is a cover sheet arranged in an endless manner from the outset.

25 is one of two main rolls about which the cover sheet 17A is wrapped. The main roll 25 is formed integrally with a cylindrical main part 26 having its lower end closed and a support part 27 in the form of a hollow shaft extended from the center of the lower end face of the main part 26 towards below. The support part 27 has a bore 27a in communication with a bore 26a of the main part 26.

28 is an electric motor fitted with a speed-reducing gearing and received within an upper portion of the bore 26a of the main part 26 of the main roll 25. An output shaft 28a of the motor is coaxially arranged as the main roll 25 and extended upwards for the most part from the main roll 25.

The support part 27 of the main roll 25 is rotatably supported by a bearing member 29 secured to a lower supporting plate 12b, while the upper end of the output shaft 28a of the motor 28 is non-rotatably mounted on a supporting member 30 secured to an upper supporting plate 12a.

When the electric current is supplied to the motor 28, its parts other than the output shaft 28a are rotated so that the main roll 25 is rotated to cause the cover sheet 17 to travel along its route of travel.

Meanwhile, if the main roll 25 is of a larger diameter such that the peripheral length of the outer peripheral surface of the main roll 25 is longer than the transverse length of the non-common region 11a, the main roll 25 need not be rotated by more than one complete revolution. For this reason, part of the cover sheet 17A may be secured to the main roll 25. In this manner, no slip is caused between the main roll 25 and the cover sheet 17A to assure more stable travel of the cover sheet 17A.

Since the screen cover opening/closing device of the present invention is made up of two rolls placed on both sides of the screen, a cover sheet and a driving source for rotating the rolls, the construction is simplified and reduced in size. Also, since the two screen covers opening or closing the non-common region are formed in parts of the endless cover sheet, these screen covers may be physically or mechanically connected to each other so that the two screen covers are synchronized in their movements and thus freed of differential movements and hence the opening degrees of the non-common regions may be equal to each other to assure stabilized opening/closing operations.

Although the difference in the aspect ratio is coped with in the above embodiments by changing the transverse width of the screen surface, it may also be coped with by changing the vertical width of the screen surface.

In this case, the transverse direction in the above embodiments may simply be changed to a vertical direction.

Although the device for opening and closing the screen cover of the liquid crystal type projector has been described in the foregoing, the present invention may also be applied to a device or opening and closing the screen of, for example, a Braun tube type display monitor.

Although the images of the high-vision television system and those of the current television system have been given above as images having different aspect ratios, there are merely exemplary, while it is possible to cope with more than two different aspect ratio images.

Besides, the particular shape and construction of the preceding embodiments of the screen cover opening/closing device are also merely exemplary and are not limitative of the present invention.

What is claimed is:

1. A screen cover opening/closing device arranged at a front side of a screen of a television receiver adapted for selectively displaying plural different aspect ratio signals and for opening and closing left and right side panel portions of the screen, comprising;
    two vertically extending rolls arranged at laterally outer sides of left and right lateral sides of said screen,
    a cover sheet endlessly wrapped around said rolls and formed with two windows at longitudinally spaced apart positions, and cover sheet running means for running said cover sheet by rotating said rolls.

2. A screen cover opening/closing device as claimed in claim 1, wherein operation of said cover sheet running means changes the relative position of said two windows of said cover sheet for changing the transverse width of the screen viewed through said windows.

3. A screen cover opening/closing device as claimed in claim 1, wherein said plural different aspect ratio signals are images of a high vision television system and images of a standard television system.

4. A screen cover opening/closing device as claimed in claim 1, wherein the screen for selectively displaying the plural different aspect ratio images is a liquid crystal display panel for a liquid crystal projector.

5. A screen cover opening/closing device as claimed in claim 1, wherein the screen cover is formed as a cover sheet having windows at longitudinal ends thereof, the longitudinal ends of said cover sheet being joined to each other by tension springs to form an endless shape so that the two windows are positioned to overlap with each other.

6. A screen cover opening/closing device as claimed in claim 1, wherein said cover sheet running means comprises one of said rolls about which said cover sheet is wrapped and a driving motor for rotationally driving said roll.

7. A screen cover opening/closing device as claimed in claim 6, wherein said driving motor is provided with a speed reducing gearing at an output shaft side thereof, said speed reducing gearing being connected to said driven roll.

8. A screen cover opening/closing device as claimed in claim 1, further comprising:
two transversely extending rolls outwardly of upper and lower side edges of the screen adapted for selectively displaying plural different aspect ratio images,
a cover sheet endlessly wrapped between said rolls and formed with two windows at longitudinally spaced apart positions, and
cover sheet running means for running said cover sheet by rotating said rolls,
whereby operation of said cover sheet running means changes the relative positions of said windows for changing the transverse or vertical width of the screen that may be viewed through said windows.

* * * * *